United States Patent [19]

Kitayama et al.

[11] 4,064,378
[45] Dec. 20, 1977

[54] ECHO CANCELLING SYSTEM FOR MULTIPLEX TELEPHONE CIRCUITS

[75] Inventors: Seishi Kitayama; Akira Sato, both of Tokyo; Junzo Tamura, Ohmiya, all of Japan

[73] Assignee: Kokusai Denshin Denwa Kabushiki Kaisha, Japan

[21] Appl. No.: 691,030

[22] Filed: May 28, 1976

[30] Foreign Application Priority Data

June 5, 1975  Japan .................................. 50-67060

[51] Int. Cl.$^2$ .............................................. H04B 3/20
[52] U.S. Cl. ................................................ 179/170.2
[58] Field of Search ................. 179/170.2, 170.6, 170.8

[56] References Cited

U.S. PATENT DOCUMENTS

| | | | |
|---|---|---|---|
| 3,787,645 | 1/1974 | Ochiai et al. ....................... | 179/170.2 |
| 3,828,147 | 8/1974 | Ochiai et al. ....................... | 179/170.2 |

*Primary Examiner*—Kathleen H. Claffy
*Assistant Examiner*—Randall P. Myers
*Attorney, Agent, or Firm*—Robert E. Burns; Emmanuel J. Lobato; Bruce L. Adams

[57] ABSTRACT

An echo cancelling system for multiplex circuits, in which an impulse response of an echo-path is obtained from signals at respective ends of the transmission path and the receiving path connected to the echo-path to produce an echo-path model, and in which a pseudo echo signal is then provided to subtract it from an echo signal of the echo-path thereby to cancel the echo signal. In accordance with this invention, adaptive echo-path models each for corresponding channel of the multiplex circuits are provided for storing impulse response signals within a holding time of an impulse response in the long distance multiplex telephone circuits, and an adaptive echo-path model for the common use of multiplex circuits is provided for storing, in a time-divisional manner according to the known queue control, (a) information within a flat delay time of the impulse response, (b) impulse response signals within the holding time of the impulse response and (c) information within a certain constant time after the impulse response. The adaptive echo-path model for the common use is activated if the level of a residual echo signal is higher than a predetermined value, and the adaptive echo-path model for each channel is activated if the level of a residual echo signal is smaller than the predetermined value.

2 Claims, 2 Drawing Figures

ECHO CANCELLING SYSTEM FOR MULTIPLEX TELEPHONE CIRCUITS

FIELD OF THE INVENTION

This invention relates to an echo cancelling system and, more particularly, to an echo cancelling system for long distance multiplex telephone circuits.

BRIEF DESCRIPTION OF THE PRIOR ART

In a long distance communication circuit, a two-wire system and a four-wire system are generally used together, and hybrid coils are used for connecting between these two kinds of systems. However, it would be almost impossible to completely perform impedance matching with these hybrid coils. Thus, reflection occurs at these hybrid coils, and this is a cause of echoes in telephone circuits and consequently this causes troubles in long distance communication circuits.

There have been heretofore employed in the art two types of systems to deal with echoes. One of them is a system for inserting a loss into one of a transmission path and a receiving path in a four-wire system in accordance with the signal levels at respective ends of the transmission path and the receiving path to suppress echoes. The other is a system, in which after an impulse response of an echo-path is obtained from signals at respective ends of the transmission path and the receiving path to produce an echo-path model, a pseudo echo signal is then provided to subtract it from an echo signal. The former one essentially needs to interrupt a communication circuit, so that suppression at the beginning of a talking voice signal causes troubles during a call. On the contrary, since the latter one does not cause these troubles it is therefore better than the former one from the view point of signal quality. However, the latter one has defects such that an echo-path model must converged and be established within a very short time after a communication circuit is connected, and such that the echo-path model thus established must be simultaneously modified in accordance with fluctuations of the circuit characteristics while the echo-path model is still disturbed at a time period of double talking. To eliminate the above described disturbance of the echo-path model at the double talking, there has been proposed a system (e.g. Japanese Patent Public disclosure No. 45521/1972), in which an adaptive echo-path model and a semistable echo-path model are provided, the relative superiority of these two models being decided by comparing between the respective levels of residual echo-signals in the two models, so that the better one of the two models is preferred to the other. However, this system needs two echo-path models having almost the same memory capacity requirements (that is, almost the same number of registers) and, particularly for multiplex communication circuits, two models must be prepared for each channel, so that this is extremely disadvantageous from an economical point of view.

BRIEF SUMMARY OF THE INVENTION

An object of this invention is to provide an echo cancelling system advantageously applicable to multiplex communication circuits from the economical view point.

To attain the above object of this invention, adaptive echo-path models each for corresponding channel of the multiplex communication circuits are provided for storing impulse response signals within a holding time of an impulse response in the multiplex communicaton circuits, and an adaptive echo-path model for the common use/of multiplex communication circuits is provided for storing, in a time-divisional manner according to the known queue control, (a) information within a flat delay time of the impulse response, (b) impulse response signals within the holding time of the impulse response and (c) information within a certain constant time after an impulse response. The adaptive echo-path model for the common use is activated if the level of a residual echo signal is higher than a predetermined value, and the adaptive echo-path model for each channel is activated if the level of a residual echo signal is smaller than the predetermined value.

BRIEF DESCRIPTION OF THE DRAWINGS

The principle, construction and operations of this invention will be clearly understood from the following detailed description taken in conjunction with the accompanying drawings, in which.

DETAILED DESCRIPTION OF THE INVENTION

Figure 1:
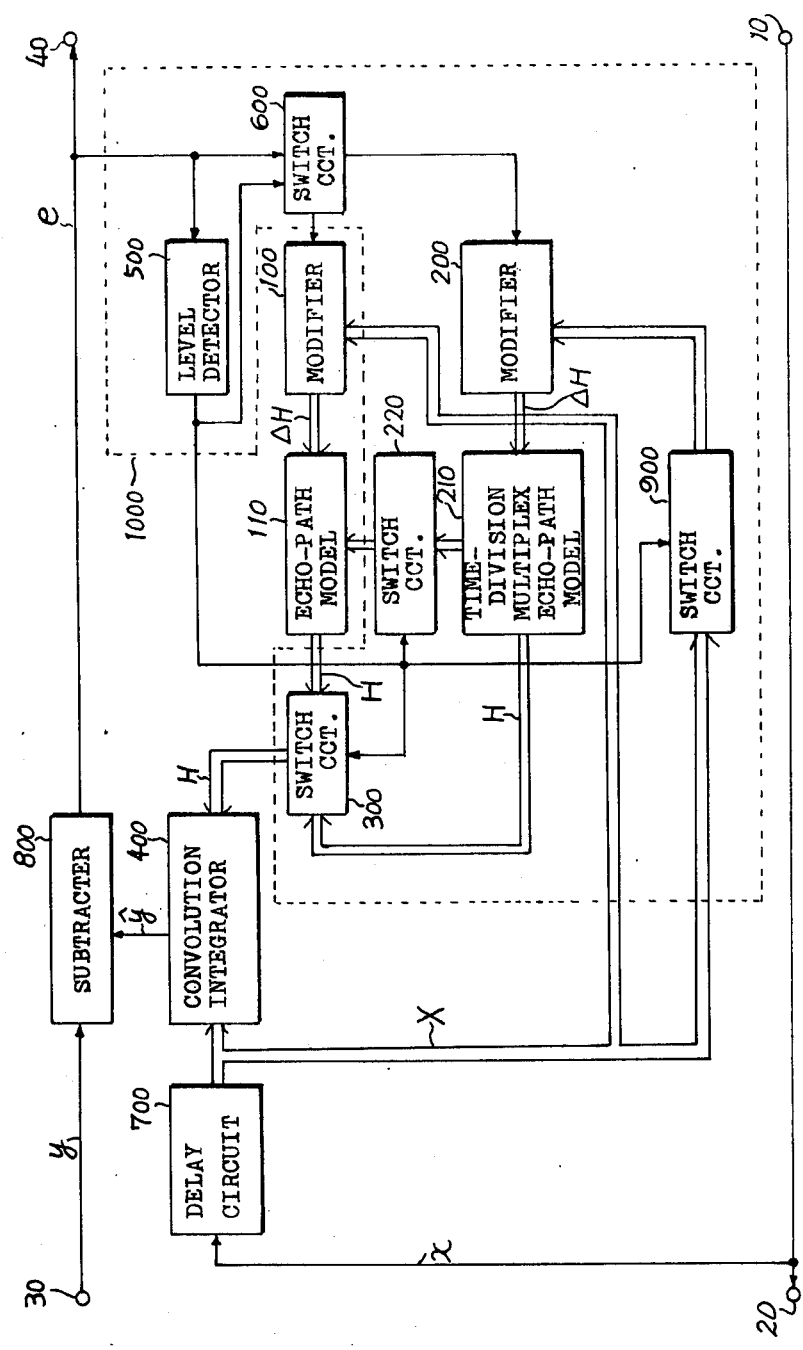
FIG. 1 is a block diagram explanatory of the principle of this invention.

With reference to FIG. 1, the principle of this invention will be described. Referenece numeral 110 indicates echo-path models each assigned for a corresponding channel of multiplex telephone circuits; 100 designates a modifier for the models 110; 210 represents a time-division multiplex echo-path model; 200 denotes a modifier for the model 210; 500 identifies a level-detector comprising, for example, some comparators for detecting whether or not the level of a remaining echo signal exceeds a predetermined threshold value and for controlling switch circuits 300, 600, 900 and 220 in accordance with the detected result; 700 shows a delay circuit with taps (for example, a shift register when a digital signal is handled) for successively delaying a signal $x$ from a far-end party to obtain a plurality of signal trains X; 400 signifies a convolution integrator for convolution integrating the signals trains X and the contents of an echo-path model (either 110 or 210), that is, impulse responses H to obtain a pseudo echo signal $\hat{y}$; and 800 is a subtractor (an adder in case of adding a signal $\hat{y}$ with a negative sign) for subtracting between an echo signal $y$ from an echo-path and a pseudo echo signal $\hat{y}$ from the convolution integrator 400, and a residual echo signal $e$ becomes an output if there is a difference between the signals $y$ and $\hat{y}$. Further, respective capacities (the number of the registers) of two echo-path models 210 and 110 are different from each other. Namely, the model 210 has enough capacity to store a flat (or end) delay time $t_1$ of an impulse response, a holding time $t_2$ of an impulse response and a certain constant time $t_3$ after the termination of an impulse response, and each model 110 has a smaller capacity which is only enough to store impulse response signals during the holding time $t_2$ of an impulse response. Each model 110, 210 can be formed by a shift register 84, a gate 85 and an adder 86 shown in FIG. 6 of U.S. Pat. No. 3,828,147, by way of example.

The modifier 100 is constructed, so that its convergence time is lengthened by reducing the unit step of the modifying operation. The modifier 200 is constructed, so that its convergence time is shortened by changing the unit step or unit increment of the modifying operation in accordance with the existence of non-existence of the periodicity of signal $x$ from a far-end party and the level deviation range of signal $x$. Moreover, since the convergence time of the modifier 100 is established to be long, there is almost no disturbance of the model during the double talking. Each modifier 100,200 is a model modifying signal producing unit (43) shown in FIGS. 2 and 6 of U.S. Pat. No. 3,828,147, by way of example.

Now, when a communication circuit is connected and the signal $x$ from a far-end subscriber is supplied to a terminal 10, the signal $x$ passes through a terminal 20 and through an echo-path including a hybrid coil (which isn't shown in FIG. 1, and afterward an echo signal $y$ is applied to a terminal 30. On the other hand, as will be described later, a pseudo echo signal $\hat{y}$ is produced and a residual echo signal $e$, developed by subtracting the pseudo echo signal $\hat{y}$ from the echo signal $y$, is sent out from a terminal 40. In this case, the residual echo signal $e$ is applied to the level detector 500, and its level is compared with a predetermined threshold value $e_{th}$ (e.g. $-20$ dBm). If a result of the level comparison operation is $|e| \geqq e_{th}$, switch circuits 220, 300, 600 and 900 are controlled by the detector 500 so as to select the modifier 200 and the echo-path model 210. If the result is $|e| < e_{th}$, each switch circuit is restored to the normal state so as to select the modifier 100 and the echo-path models 110. The contents of the echo-path model 210 have been cleared at the initial condition.

If communication circuits are connected to terminals 10, 20, 30 and 40 and the input signal $x$ is applied to the terminal 10, the signal $e$ found by subtracting $\hat{y}$ from $y$ is large because the signal $\hat{y}$ of the initial condition is very small. Therefore, a condition: $|e| \geqq e_{th}$ is obtained, and the level detector 500 controls switch circuits 220, 300, 600 and 900 to select the model 210. Namely, at the time of setting up a communication circuit, the residual echo $e$ and the signal trains $X$ are applied to the modifier 200, so that a modification factor $\Delta H$ is obtained therefrom. Thus, the contents of the time division multiplex echo-path model 210 become values H modified by $\Delta H$ and are applied to the convolution-integrator 400, and a convolution-integration operation is carried out there with signal trains $X$ to obtain a pseudo echo signal $\hat{y}$. The signal $\hat{y}$ is applied to the subtracter 800 and is subtracted from the echo signal $y$ received from the echo-path so that the residual echo signal $e$, which is $y - \hat{y}$, is obtained. This signal $e$ is applied to the modifier 200 again to control the modification factor $\Delta H$. The same convergence operations are repeated further and, when a condition: $|e| \leq e_{th}$ is obtained the level detector 500 switches the switches 300, 600 and 900 to the echo-path models 110 and, at the same time, controls the switch circuit 220 to transfer the contents (information of a flat delay time $t_1$ of an impulse response signal and of a holding time $t_2$ of a impulse response) of the model 210 to the models 110. Then a convolution-integration operation is performed with impulse responses H from the models 110 and the signals X and, afterwards, if $|e| \leqq e_{th}$, the same operations are repeated until the residual echo $e$ converges to zero. In a case where the condition: $|e| \geqq e_{th}$ is again obtained in response to, for example, a sudden condition change of the communication circuit etc., each switch is restored to the normal state by the level detector 500.

Further, when the model 210 sends out its contents, its contents are at once cleared to receive the next signal. Namely, a part 1000 surrounded by broken lines in FIG. 1 is equivalent to a below-described part 1000a surrounded by broken lines in FIG. 2 and is only used at the time of setting up a communication circuit or a sudden change of a communication circuit condition, and afterwards becomes a spare one. Namely, the circuit within the broken lines is switched for multiplex circuits and is used in common for all the multiplex circuits in a time-divisional manner according to the known queue control.

Figure 2:
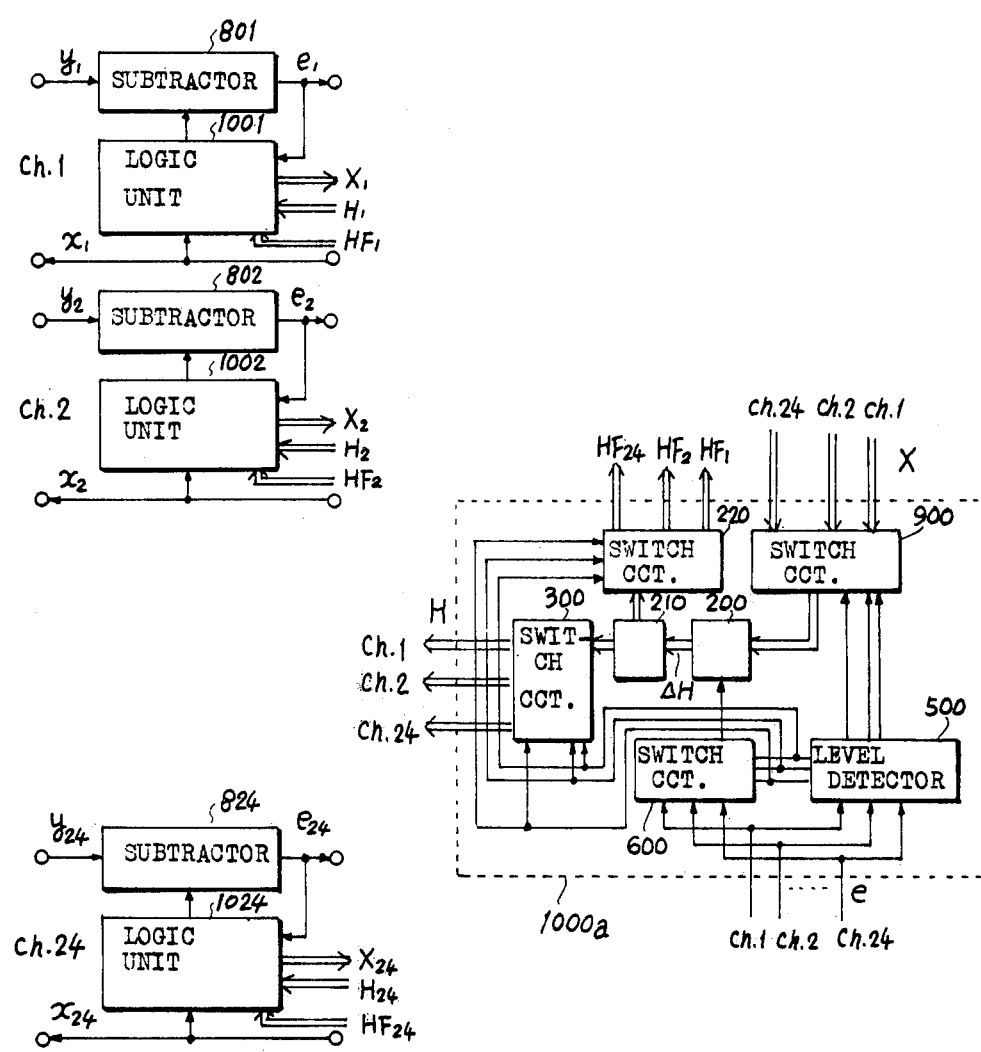
FIG. 2 is a block diagram illustrating main parts of an embodiment of this invention.

An example of this invention will be described with reference to FIG. 2. In FIG. 2, reference numerals 801, 802, ..., and 824 respectively designate subtracters of respective multiplex channels ch 1, ch 2, ..., and ch 24. Each of the reference numerals 1001, 1002, ..., and 1024 denotes a logic unit including a delay circuit, a convolution integrator, a model having a small capacity (which can store only signals within a holding time of an impulse response) and a model modifier having a long convergence time; and a part 1000a surrounded by broken lines shows a multiplex circuit example of the part 1000 in FIG. 1.

As described above, in the apparatus of this invention, there is provided an adaptive echo-path model for each channel for storing impulse response signals within a holding time of an impulse response for each channel in long distance multiplex telephone circuits and, for the common use of multiplex circuits, an adaptive echo-path model for storing in a time-divisional manner according to the known queue control, (a) information within a flat delay time of the impulse response. (b) impulse response signals within the holding time of the impulse response and (c) information within a certain constant time after the impulse response. The adaptive echo-path model for common use is activated if the level of a residual echo signal $e$ is higher than a predetermined value, and the adaptive echo-path model for each channel is activated if the level of a residual echo signal $e$ is smaller than the predetermined value. Only one common model may be enough, for example for 24 channels and is economical for the use of multiplex circuits. On the other hand, since the model for each channel deals with only a small extent of a residual echo signal $e$, the precision can be raised in view of the signal-to-noise ratio. Moreover, since a convergence time is established to be long, there is almost no disturbance in the model for each channel due to external disturbance and noises during double talking. Furthermore, since the echo-path model can be modified in accordance with the instantaneous circuit condition change, circuitry becomes more simple than that of the conventional system, and the capacity of the model for each channel is, for example, about one-third of the conventional system and very economical.

What we claim is:

1. An echo cancelling system for multiplex telephone channels comprising:
   first adaptive echo-path model means having a short convergence time and a first pseudo impulse response of a sufficiently long time for generating pseudo echo signals;
   a plurality of second adaptive echo-path model means equal in number to the number of said multiplex telephone channels and each having a long convergence time and a second pseudo impulse response shorter than said first pseudo impulse response for generating pseudo echo signals;

a plurality of echo cancelling means equal in number to the number of said multiplex telephone channels and each for combining an echo-path signal in a respective one of said telephone channels with the output of a corresponding one of said second adaptive echo-path model means for reducing the respective echo path signal detection means for detecting when a residual echo of any telephone channel of said echo cancelling means exceeds a predetermined threshold and for thereby generating a control output signal corresponding to said telephone channel having the detected residual echo signal; and control means activated by said control output signal for switching said first adaptive echo-path model means in substitution for the one of said second adaptive echo-path model means corresponding to the telephone channel having the detected residual echo signal until the residual echo signal is less than the threshold value and thereafter for transferring the contents of said first adaptive echo-path model means to said corresponding second adaptive echo-path model means and switching said corresponding second adaptive echo-path model means in substitution for said first adaptive echo-path model means to maintain the residual echo signal below the threshold value.

2. An echo cancelling system, for use with multiplex telephone channels comprising:

first pseudo echo generating means for generating pseudo echo signals according to a first adaptive echo-path model having a short convergence time;

a plurality of second pseudo echo generating means equal in number to a number of multiplexed telephone channels for generating pseudo echo signals each according to a respective one of a plurality of second adaptive echo-path models equal in number to the number of multiplexed telephone channels and each of which is shorter than the first adaptive echo-path model and has a longer convergence time than the first adaptive echo-path model;

subtractor means for subtracting the respective pseudo echo signals developed by said second pseudo echo generating means from respective echo signals applied to the respective multiplexed telephone channels to develop residual echo signals applied to the respective multiplexed telephone channels and equal to the differeneces between the respective echo signals and pseudo echo signals;

detection means for detecting when a residual echo signal exceeds a certain threshold value and for generating a control signal when the residual echo signal exceeds the threshold value; and control means responsive to the control signal for switching said first pseudo echo generating means in substitution for the corresponding one of said second pseudo echo generating means corresponding to the detected residual echo signal for generating pseudo echo signals according to the first adaptive echo-path model until the residual echo signal is less than the threshold value and the thereafter the transferring the first adaptive echo-path model to said corresponding second pseudo echo generating means and switching said corresponding second pseudo echo generating means in substitution for said first pseudo echo generating means to maintain the residual echo signal below the threshold value.

* * * * *